United States Patent
Jeong et al.

(10) Patent No.: US 8,874,126 B2
(45) Date of Patent: Oct. 28, 2014

(54) METHOD AND APPARATUS FOR INITIAL RANGING IN WIRELESS COMMUNICATION SYSTEM INCLUDING HETEROGENEOUS NETWORK

(75) Inventors: Su-Ryong Jeong, Yongin-si (KR); Sung-Eun Park, Seoul (KR); Hyun-Kyu Yu, Yongin-si (KR); Chi-Woo Lim, Suwon-si (KR); Shuangfeng Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 295 days.

(21) Appl. No.: 13/415,730

(22) Filed: Mar. 8, 2012

(65) Prior Publication Data

US 2012/0231830 A1   Sep. 13, 2012

(30) Foreign Application Priority Data

Mar. 8, 2011   (KR) ........................ 10-2011-0020281

(51) Int. Cl.
*H04W 72/00*   (2009.01)
*H04W 48/12*   (2009.01)
*H04W 48/20*   (2009.01)
*H04W 72/08*   (2009.01)
*H04W 72/04*   (2009.01)

(52) U.S. Cl.
CPC .............. *H04W 48/12* (2013.01); *H04W 48/20* (2013.01); *H04W 72/082* (2013.01); *H04W 72/042* (2013.01)
USPC .................. 455/452.2; 455/67.13; 455/456.3; 455/509

(58) Field of Classification Search
USPC ................ 455/452.1, 452.2, 513, 515, 456.1, 455/456.3, 457, 67.11, 67.13, 509; 370/335, 329
See application file for complete search history.

(56) References Cited

U.S. PATENT DOCUMENTS

| | | | |
|---|---|---|---|
| 6,735,339 B1 * | 5/2004 | Ubale | 382/232 |
| 2007/0202882 A1 * | 8/2007 | Ju et al. | 455/450 |
| 2009/0318166 A1 * | 12/2009 | Kim et al. | 455/456.1 |
| 2011/0268091 A1 * | 11/2011 | Jang et al. | 370/335 |

* cited by examiner

*Primary Examiner* — John J Lee

(57) ABSTRACT

An apparatus and method for initial ranging in a wireless communication system including a heterogeneous network. An operation of a terminal includes selecting a serving cell considering a biased value of a base station applying range expansion. The operation also includes receiving ranging code classification information and threshold information associated with the serving cell. The operation further includes, if a channel quality with the serving cell is less than the threshold, selecting one a plurality of poor-expected-ranging codes indicated by the ranging code classification information, and performing initial ranging using the selected poor-expected-ranging code.

36 Claims, 12 Drawing Sheets

METHOD AND APPARATUS FOR INITIAL RANGING IN WIRELESS COMMUNICATION SYSTEM INCLUDING HETEROGENEOUS NETWORK

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on Mar. 8, 2011 and assigned Serial. No. 10-2011-0020281, the entire disclosure of which is hereby incorporated by reference.

TECHNICAL FIELD OF THE INVENTION

The present disclosure relates to wireless communication systems.

BACKGROUND OF THE INVENTION

Recently, owing to the demand for data communication and an increase of various communication services in a wireless communication system, various methods for increasing transmission capacity are being proposed. In one method, a technology for heterogeneous network is being researched. The heterogeneous network represents a communication system in which Base Stations (BSs) having various prestige, cell coverage, and characteristics are managed in combination.

FIG. 1 illustrates an example of a construction of a heterogeneous network system. Referring to FIG. 1, a macro cell 100 and one or more pico cells 102, 104, and 106 having cell coverage of different sizes are overlaid and managed. Also, although not illustrated in FIG. 1, at least one femto cell can be further included within the macro cell 100 of the heterogeneous network. For description convenience below, a pico cell and a femto cell are commonly called a 'small cell' in the present disclosure.

The heterogeneous network can reuse a transmission resource in a small cell existing within a macro cell and increase the whole transmission capacity of the system. For example, in a situation where one small cell having a transmission band of 10 Mega Hertz (MHz) is installed in the macro cell in an environment using a 10 MHz transmission band, the total transmission band of 20 MHz can be secured ideally. That is, in a situation where 'N' small cells are installed in one macro cell, a transmission band corresponding to 'N' times of an existing transmission band can be secured ideally. In other words, the effect of increasing a transmission rate as much as 'N' times can be expected.

However, in the real environment, although 'N' small cells can be installed within one macro cell, the cells may fail to get a transmission rate of 'N' times because of interference between heterogeneous cells or non-uniform distribution of terminals. That is, in a real heterogeneous network system, interference between the macro cell and the small cell and interference between the small cells can lead to the occurrence of performance degradation. Also, the non-uniform distribution of terminals in the small cells can lead to generation of unavailable resources, causing performance degradation.

To minimize the performance degradation resulting from inter-cell interference and loading unbalance in the wireless communication system including the heterogeneous network, a range expansion technique of effecting an increase of the coverage of a small cell can be used in cell selection. The range expansion technique is a technology for adding a constant biased value to a channel quality of a corresponding cell at channel quality comparison for cell selection, thereby increasing a possibility that the cell will be selected. However, in reality, a terminal may select a cell of a poor channel quality as a serving cell because the biased value is added to the channel quality at cell selection. In a situation where the terminal selects the cell as the serving cell despite the poor channel quality, a situation can occur in which the terminal cannot receive even a control signal, a broadcast channel and the like.

Accordingly, an alternative for ensuring a minimum communication quality when a terminal located in an area applying the range expansion technique attempts initial access should be presented.

SUMMARY OF THE INVENTION

To address the above-discussed deficiencies of the prior art, it is a primary aspect of the present disclosure to provide an apparatus and method for ensuring a minimum communication quality in a wireless communication system.

Another aspect of the present disclosure is to provide an apparatus and method for initial access of a terminal located in an area applying a range expansion technique in a wireless communication system.

A further aspect of the present disclosure is to provide an apparatus and method for performing initial access using a ranging preamble code allocated for a situation where a low channel quality is expected in a wireless communication system.

Yet another aspect of the present disclosure is to provide an apparatus and method for providing a low-interference resource for a terminal expecting a low channel quality in a wireless communication system.

The above aspects are achieved by providing an apparatus and method for initial ranging in a wireless communication system including a heterogeneous network.

According to one aspect of the present disclosure, an operation method of a terminal in a wireless communication system is provided. The method includes selecting a serving cell in consideration of a biased value for a base station applying range expansion. The method also includes receiving ranging code classification information and threshold information associated with the serving cell. The method further includes, if a channel quality with the serving cell is less than the threshold, selecting one of a plurality of poor-expected-ranging codes indicated by the ranging code classification information. The method still further includes performing initial ranging using the selected poor-expected-ranging code.

According to another aspect of the present disclosure, an operation method of a BS in a wireless communication system is provided. The method includes transmitting ranging code classification information and threshold information. The method also includes receiving one of a plurality of poor-expected-ranging codes indicated by the ranging code classification information. The method further includes recognizing that a terminal having transmitted the poor-expected-ranging code has a channel quality less than or equal to the threshold.

According to a further aspect of the present disclosure, a terminal apparatus in a wireless communication system is provided. The apparatus includes a controller and a modulator/demodulator (modem). The controller is configured to select a serving cell in consideration of a biased value for a BS applying range expansion. The modem is configured to receive ranging code classification information and threshold information associated with the serving cell. If a channel quality with the serving cell is less than the threshold, the controller is configured to control to select one of a plurality of poor-expected-ranging codes indicated by the ranging code classification information, and perform initial ranging using the selected poor-expected-ranging code.

According to yet another aspect of the present disclosure, a BS apparatus in a wireless communication system is provided. The apparatus includes a modem and a controller. The modem is configured to transmit ranging code classification information and threshold information. If one of a plurality of poor-expected-ranging codes indicated by the ranging code classification information is received, the controller recognizes that a terminal having transmitted the poor-expected-ranging code has a channel quality less than or equal to the threshold.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 2 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system Preferred embodiments of the present disclosure will be described herein below with reference to the accompanying drawings. In the following description, well-known functions or constructions are not described in detail since they would obscure the disclosure in unnecessary detail.

The present disclosure relates to an apparatus and method for performing initial ranging in a wireless access system including a heterogeneous network.

A technology for ensuring a minimum communication quality in a wireless communication system including a heterogeneous network when a terminal located in an area applying a range expansion technique attempts initial access, according to the present disclosure, is described below. For description convenience, the present disclosure uses terms and names defined in the Institute of Electrical and Electronics Engineers (IEEE) 802.16m standard. However, the present disclosure is not limited by the terms and names, and is applicable even to systems according to other standards.

Figure 1:
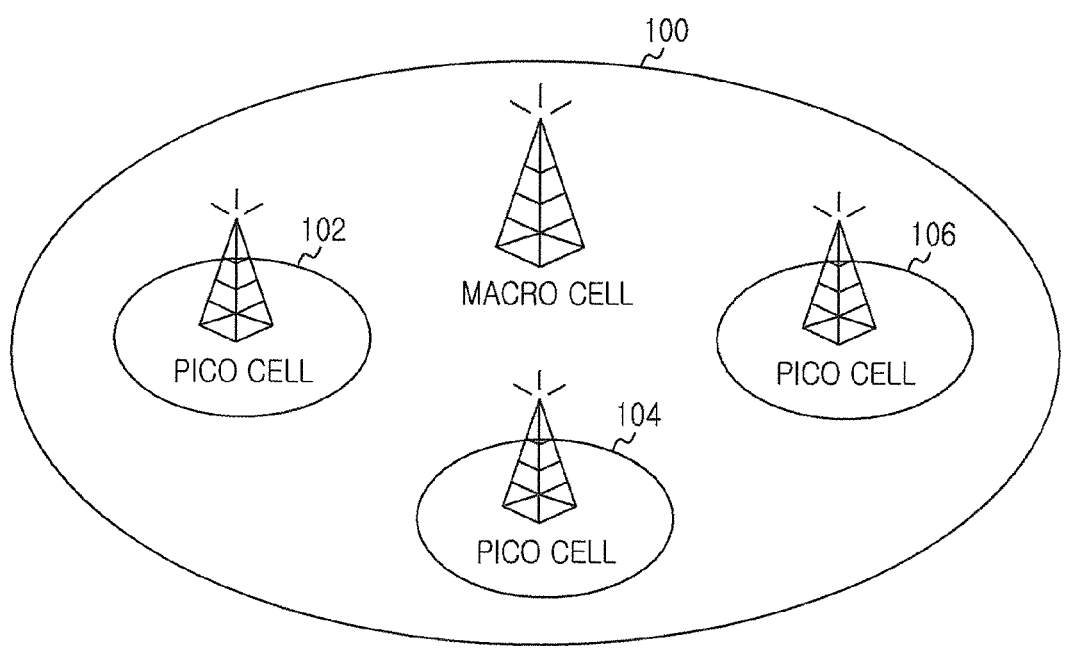
FIG. 1 illustrates an example of a construction of a heterogeneous network system.
Figure 2:
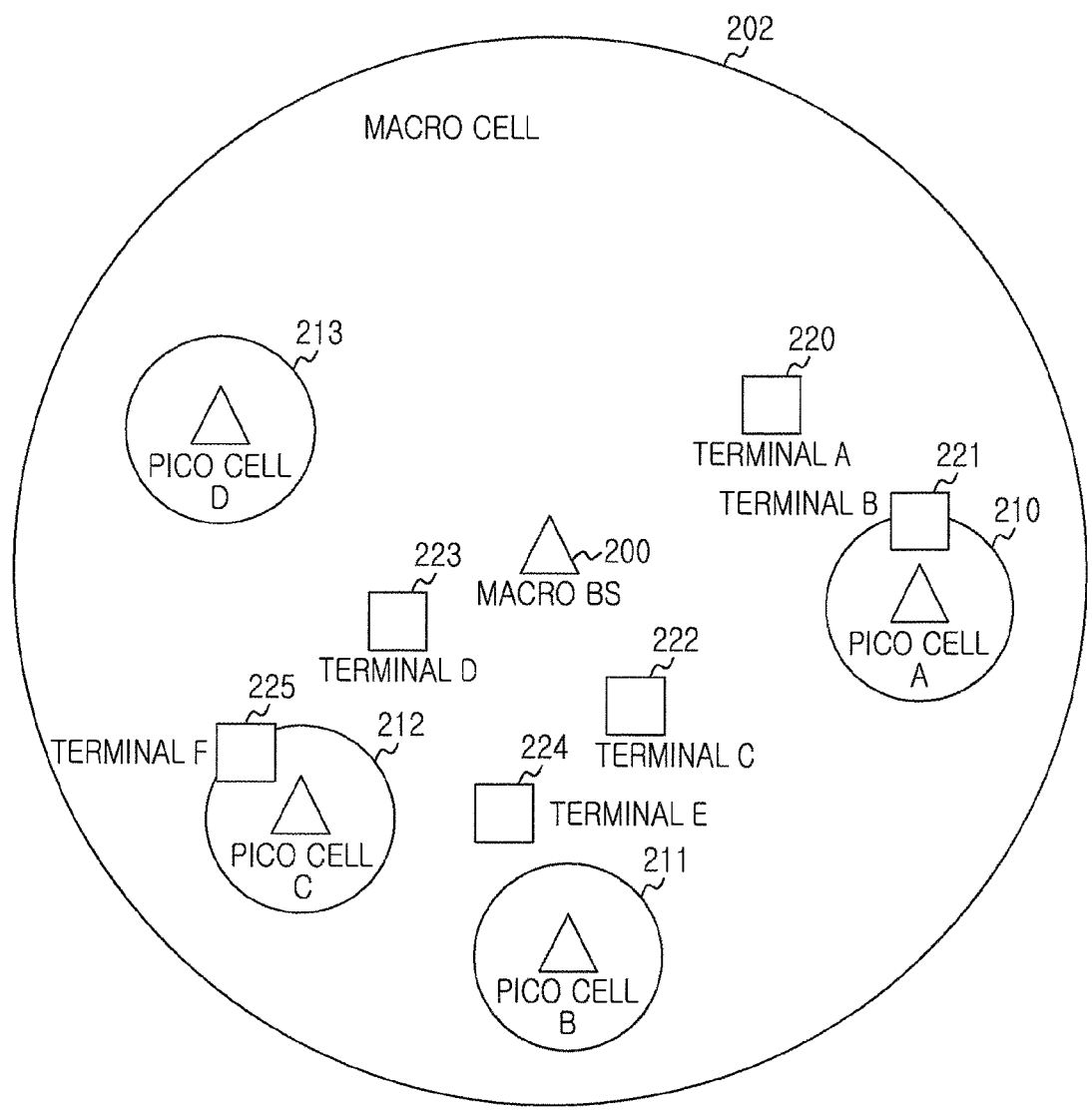
FIG. 2 illustrates an example of terminal distribution in a wireless communication system according to an embodiment of the present disclosure.

FIG. 2 illustrates an example of terminal distribution in a wireless communication system according to an embodiment of the present disclosure.

Referring to FIG. 2, a plurality of pico cells 210 to 213 exist within a macro cell 202 of a macro Base Station (BS) 200. Terminals 220 to 225 can measure signal strength for respective cells, and select serving cells according to quality factors of the measured signal strength. Accordingly, the terminal B 221 and the terminal F 225 select the pico cell A 210 and the pico cell C 212 as serving cells, respectively. Accordingly, the pico cell A 210 and the pico cell C 212 can allocate resources to the terminal B 221 and the terminal F 225, respectively. In contrast, the pico cell B 211 and the pico cell D 213 not selected as serving cells cannot allocate resources. Accordingly, due to the pico cell B 211 and the pico cell D 213, an amount of transmissible resources increases but, in reality, the improvement of a transmission rate cannot be expected. As described above, in a situation where a lot of pico cells fail to allocate resources to terminals within the heterogeneous network, there is a problem of decreasing a transmission efficiency of the whole heterogeneous network.

As a method for addressing the problem described with reference to FIG. 2, a range expansion technology for arbitrarily expanding a service range of a small BS having a small service coverage within the heterogeneous network and servicing more users can be applied. In detail, in a situation where there are two adjacent cells of which one services a plurality of terminals and the other services a small number of terminals, the system adds a biased value to the cell servicing only the small number of terminals, leading to selection of the cell as a serving cell. Thus, each cell has average service terminal distribution. The range expansion technique is described below in detail.

Figure 3:
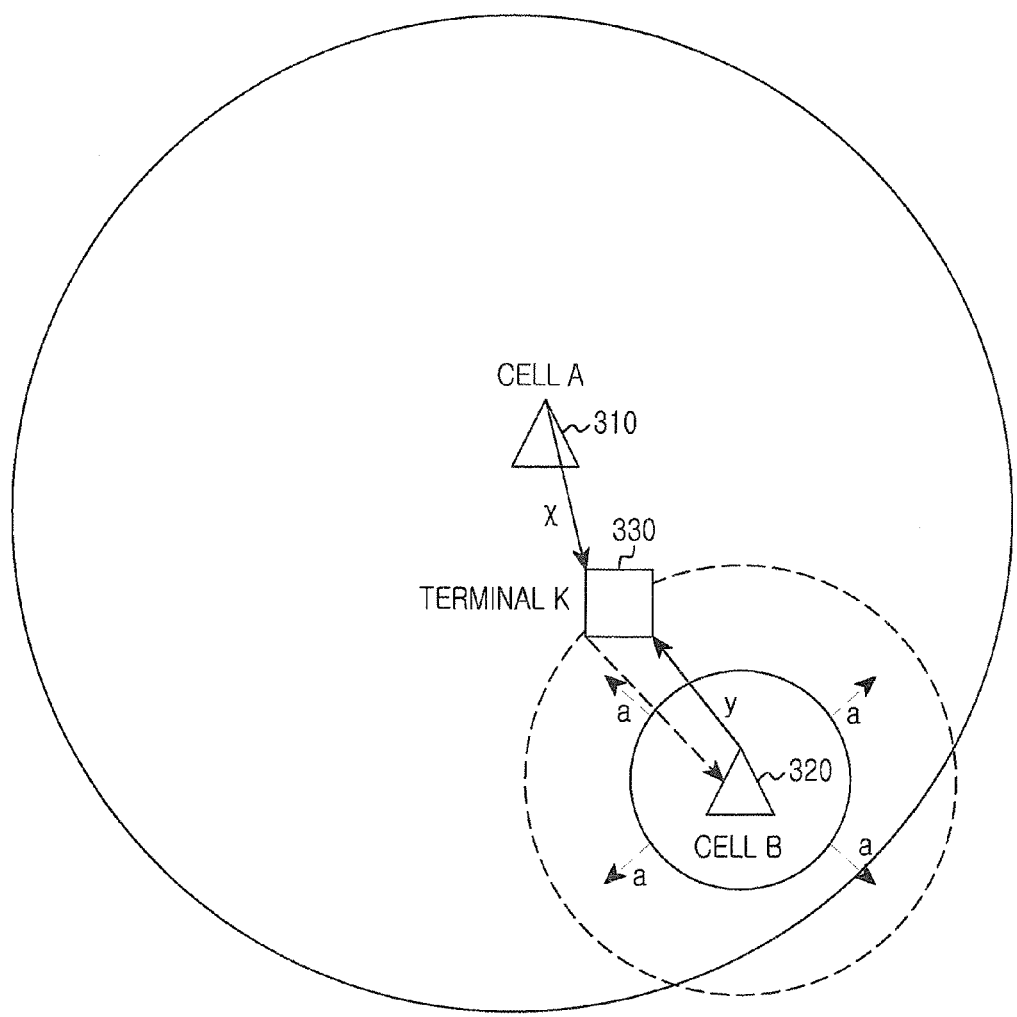
FIG. 3 illustrates service range expansion according to a range expansion technique in a wireless communication system according to an embodiment of the present disclosure.

FIG. 3 illustrates service range expansion according to a range expansion technique in a wireless communication system according to an embodiment of the present disclosure.

Referring to FIG. 3, a cell A 310 services a relatively wide area, and includes a large number of terminals to service within the wide range. A cell B 320 services a relatively small range, and includes a small number of terminals to service within the small range. For example, the cell A 310 can be a macro cell, and the cell B 320 can be one of a pico cell, a femto cell, and a small cell. A terminal K 330 is in process of selecting a serving cell of the cell A 310 and the cell B 320. For description convenience, in the present disclosure, 'x' denotes a received signal strength that the terminal K 330 measures for the cell A 310, and 'y' denotes a received signal strength for the cell B 320.

Generally, the terminal K 330 selects, as a serving cell, a cell corresponding to a higher value between 'x' and 'y'. In other words, if the value of 'x' is higher than the value of 'y', the terminal K 330 selects the cell A 310 and, if the value of 'y' is higher than the value of 'x', the terminal K 330 selects the cell B 320. That is, the terminal K 330 compares the values of 'x' and 'y'. However, in a situation where a biased value 'a' is added to the cell B 320 according to range expansion, the terminal K 330 compares the values of 'x' and 'y×a'. In other words, if the value of 'x' is higher than the value of 'y×a', the terminal K 330 selects the cell A 310 and, if the value of 'y×a' is higher than the value of ax', the terminal K 330 selects the cell B 320. Although the cell A 310 can allocate a channel of better quality to the terminal K 330, the cell A 310 may fail to ensure resources that the cell A 310 will provide for the terminal K 330. In this situation, the terminal K 330 has access to the cell B 320 although a channel quality is poor, thereby being capable of receiving an allocation of relatively more resources.

According to the range expansion technique, owing to a high biased value, a cell having a very poor channel quality can be selected as a serving, cell. In this situation, a situation can occur in which the poor channel quality makes it difficult or impossible to receive a control signal, a broadcast channel and the like. Accordingly, the cell A 310 having coverage overlaid with that of the cell B 320 can seek to alleviate inter-cell interference by either transmitting a signal at low power at a specific subframe or a specific subband/subchannel or transmitting no signal. The interference alleviation through low-power signal transmission or signal non-transmission as above is called 'interference coordination'. For example, schemes of FIGS. 4A and 4B below can be given.

Figure 4A:
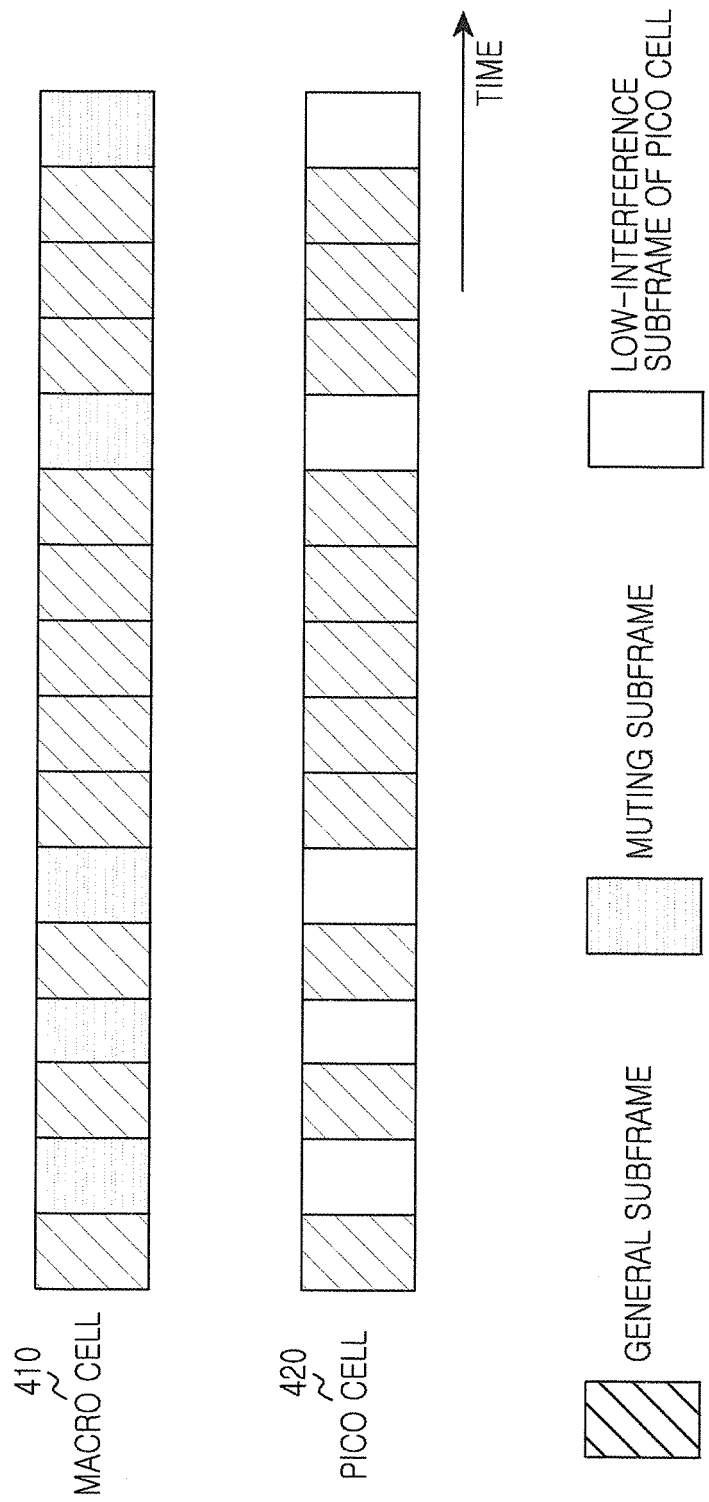
FIGS. 4A and 4B illustrate examples of resource use for interference coordination in a wireless communication system according to an embodiment of the present disclosure.
Figure 4B:
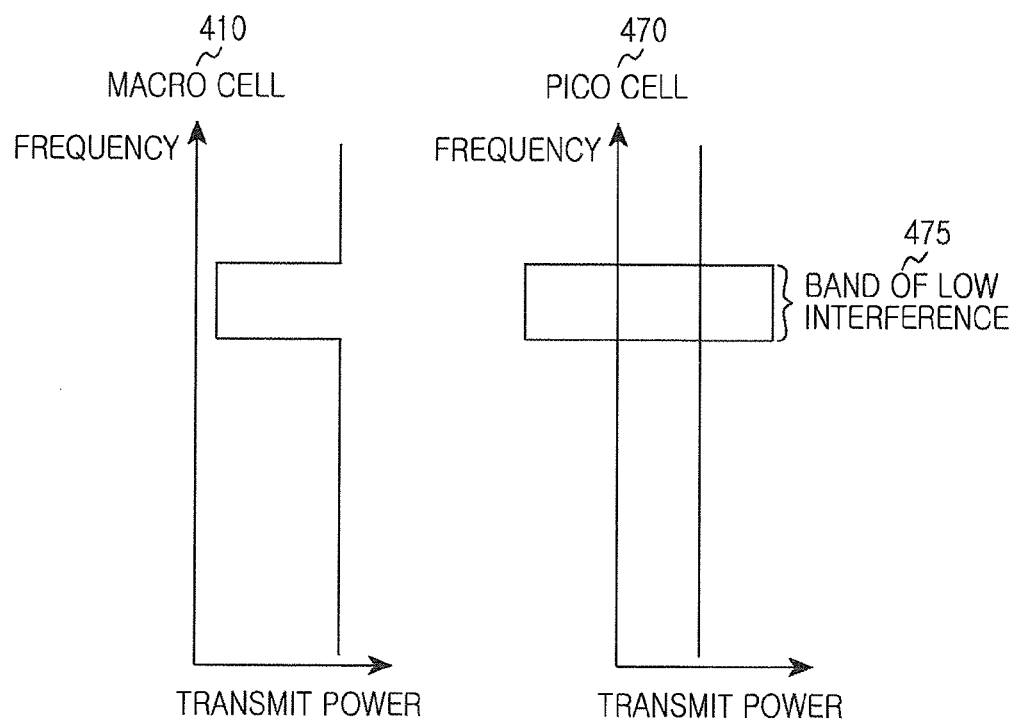

FIGS. 4A and 4B illustrate examples of resource use for interference coordination in a wireless communication system according to an embodiment of the present disclosure.

Referring to FIG. 4A, a macro cell 410 uses some subframes as muting subframes transmitting no signal. According to this, in a muting-subframe duration, a pico cell 420 can secure subframes having low interference. Referring to FIG. 4B, a macro cell 460 either transmits a signal having low power at a specific frequency domain (e.g., a specific subband or subchannel) or transmits no signal. Accordingly, a pico cell 470 suffers low interference at the specific frequency domain (475). Accordingly, the pico cell 470 can use the specific frequency domain (475) to support a terminal of a poor channel quality.

A terminal can attempt initial access to a cell applying the range expansion technique. In this situation, if the terminal attempts the initial access during an interference-non-coordinated time duration, unnecessary power consumption takes place and successful initial access is not ensured. Accordingly, the present disclosure proposes an initial access procedure as follows.

A general initial cell selection method of a terminal is described below. A BS downlink transmits a signal of a preamble and the like. By detecting a ranging preamble code of a synchronization channel having the best channel state, the terminal attempts synchronization, and acquires a cell identifier (ID). The BS transmits system information on its own cell through a frame header and, by receiving the frame header, the terminal acquires the system information of the BS. After that, the BS transmits supplementary information, e.g., a position of a random access channel and the like through a broadcast channel and the like, and the terminal attempts initial entry access using the random access channel. The random access channel can be denoted as an initial ranging channel.

In a situation where smooth communication cannot be expected because a channel sensitivity and reception Signal to Interference Noise Ratio (SINR) of a serving cell that a terminal finally selects through range expansion are low, the present disclosure proposes a way for ensuring stable communication and enhancing transmission efficiency. An initial access procedure according to an embodiment of the present disclosure is given as follows.

In Step 1, a terminal acquires biased value information according to range expansion for a corresponding cell and other adjacent cells, through signals received before attempting initial entry, e.g., a frame header, a broadcast channel, and the like. For example, system information transmitted by a specific BS can include a list of neighboring BSs applying range expansion, and biased values of the neighboring BSs. In another example, each BS can transmit information on whether the BS applies range expansion, and a biased value. Further, the terminal measures received signal strength for neighboring BSs, channel qualities and the like, and selects a serving cell in consideration of the biased value information.

In Step 2, a BS transmits a synchronization channel, a frame header, a broadcast channel, a data channel, and the like. The terminal attempting initial entry confirms downlink synchronization and corresponding cell identification information using the synchronization channel, and collects system information for communication with a serving cell through the frame header and the broadcast channel. Here, the system information includes ranging code set information of a corresponding cell. The BS transmits threshold information and additional information on a ranging preamble code, through the frame header or the broadcast channel.

The threshold is a reference value for determining that an initial entry terminal is unsuitable for performing communication with a serving cell. Before the terminal selecting a range expanded cell as a serving cell attempts initial entry, if a reception SINR of less than the threshold is expected, according to a process to be described below, the terminal performs an initial ranging procedure using a ranging preamble code designated by a BS, thereby notifying the BS that the reception SINR of less than the threshold is expected.

The additional information on the ranging preamble code indicates a ranging preamble code that will be used when the terminal expecting the reception SINR less than the threshold attempts initial ranging. For example, the system sets some existing ranging preamble codes as a separate group, and can define so that the terminal expecting the reception SINR less than the threshold uses the some ranging preamble codes belonging to the separate group. For description convenience, in the present disclosure, the ranging preamble code defined to be used by the terminal expecting the reception SINR less than the threshold is denoted as a 'poor-expected-ranging code'.

Figure 5:
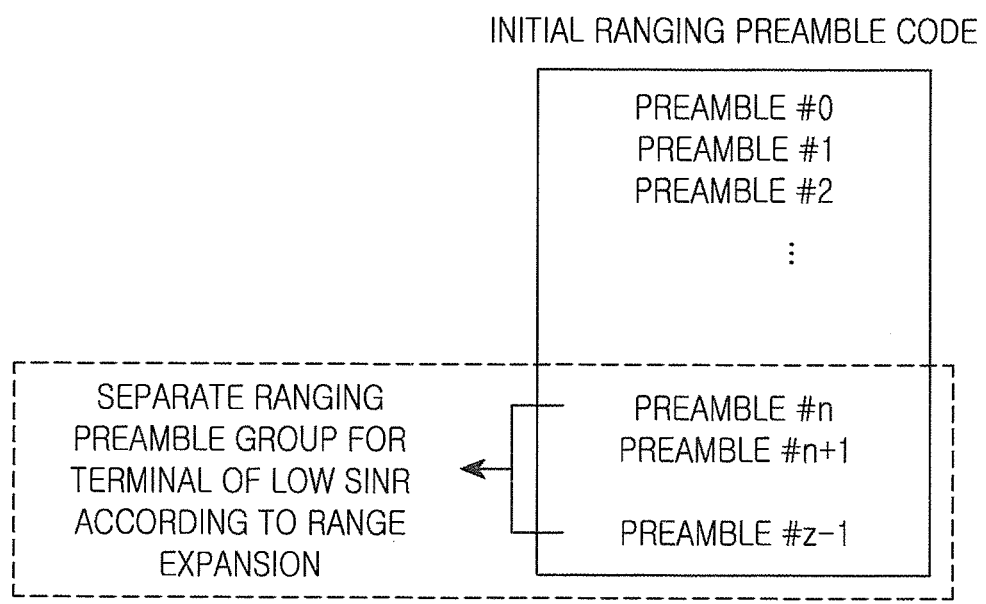
FIG. 5 illustrates an example of poor-expected-ranging code allocation in a wireless communication system according to an embodiment of the present disclosure.

For example, the poor-expected-ranging code can be defined as in FIG. 5 below. FIG. 5 illustrates an example of poor-expected-ranging code allocation in a wireless communication system according to an embodiment of the present disclosure. Referring to FIG. 5, a number 'z' of ranging preamble codes (#0 to #z−1) exist. The system allocates the ranging preamble codes (#n to #z−1) as poor-expected-ranging codes. Accordingly, a BS transmits allocation information of the poor-expected-ranging codes through the frame header or the broadcast channel. For instance, the allocation information of the poor-expected-ranging codes can include at least one of information specifying values of the poor-expected-ranging codes, information indicating the index limits of the poor-expected-ranging codes, an 'n' value, and an 'n-z' value.

Figure 6:
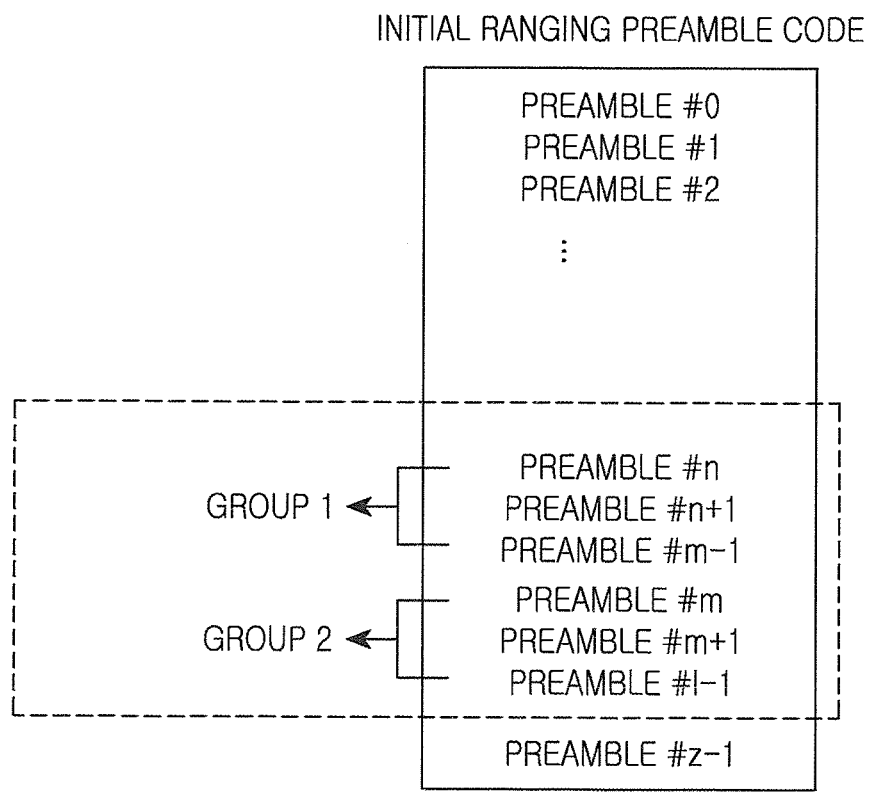
FIG. 6 illustrates another example of poor-expected-ranging code allocation in a wireless communication system according to an embodiment of the present disclosure.

According to another embodiment of the present disclosure, the poor-expected-ranging codes can be classified into a plurality of groups in order to express additional information. For instance, the poor-expected-ranging codes can be grouped to notify a different cell corresponding to reception signal strength higher than that of a serving cell. In other words, the poor-expected-ranging codes can be grouped to notify a different cell exerting interference to a terminal. FIG. 6 illustrates another example of poor-expected-ranging code allocation in a wireless communication system according to an embodiment of the present disclosure. Referring to FIG. 6, among ranging preamble codes (#n to #z−1) allocated as the poor-expected-ranging codes, ranging preamble codes (#n to #m−1) can be designated as Group 1, and ranging preamble codes (#m to #l−1) can be designated as Group 2. Each group corresponds to adjacent BSs of a serving cell. In a situation where the terminal expects a reception SINR less than the threshold, there is a high possibility that there will be a different cell corresponding to reception signal strength higher than that of a selected serving cell. In this situation, by using one of poor-expected ranging codes belonging to a group indicating the different cell corresponding to the higher reception signal strength, the terminal can notify a serving BS of the different cell corresponding to the higher reception signal strength. Information notifying the group classification can be forwarded through a broadcast channel of the serving BS. For example, in a situation where a BS #1 and a BS #2 exist nearby the serving BS, the serving BS can instruct terminals expecting a high reception signal strength from the BS #1 and a low SINR to attempt initial ranging using the ranging preamble code of Group 1, and terminals expecting a high reception signal strength from the BS #2 and a low SEW to attempt initial ranging using the ranging preamble code of Group 2, through a broadcast channel.

In Step 3, the terminal receiving separate ranging preamble code group information according to the threshold and the range expansion stores the acquired information. If a reception SINR less than the threshold is expected for a serving cell, the terminal attempts initial ranging using the poor-expected-ranging code. In a situation where poor-expected-ranging codes are grouped as illustrated in FIG. 6, the terminal selects a poor-expected-ranging code within a group corresponding to a cell exerting the highest interference.

In Step 4, the serving BS receiving the poor-expected-ranging code recognizes that the terminal is a terminal expecting a low SINR according to range expansion. The serving BS sends a response to the low SINR expectation together with a ranging response signal to the terminal, and provides information on an interference-coordinated resource (e.g., frame or channel). The interference-coordinated resource includes a low-interference subframe illustrated in FIG. 4A or a low-interference frequency domain illustrated in FIG. 4B. In a situation where the terminal expects the low SINR, the serving BS cannot ensure smooth communication even in a general data channel. Accordingly, the serving BS performs communication with the terminal through the interference-coordinated resource, not the general data channel.

In a situation where the interference-coordinated resource is a low-interference subframe as illustrated in FIG. 4A, information on the interference-coordinated resource can include at least one of a time point at which the low-interference subframe is transmitted, and a period. In an embodiment, the information on the interference-coordinated resource can include at least one of a transmission time point of an interference-coordinated subframe to be allocated uniquely to the terminal, and a period. In a situation where the interference-coordinated resource is a low-interference frequency domain as illustrated in FIG. 4A, the information on the interference coordinated resource includes at least one of a transmission time point of a low-interference subchannel, a period, and a subchannel index. In an embodiment, the information on the interference-coordinated resource can include at least one of a transmission time point of an interference-coordinated subchannel to be allocated uniquely to the terminal, a period, and a subchannel index. To decide the transmission time point of the interference-coordinated resource to be allocated uniquely to the terminal, the period and the like, the serving BS can use group classification information of FIG. 6.

In Step 5, the serving BS having transmitted the information on the interference-coordinated resource that will be used by the terminal performs communication with the terminal within notified resource limits. Resource allocation to the terminal is achieved within the notified interference-coordinated resource. Accordingly, the terminal can reduce power consumption by discontinuing decoding operation during other time duration than the notified resource limits.

The aforementioned description uses an SINR as an index for indicating a channel quality. Accordingly, a system according to the present disclosure can use a Signal to Noise Ratio (SNR), a Carrier to Interference and Noise Ratio (CINR) and the like, in place of the SINR.

The aforementioned process is arranged using formulas as follows.

In a situation where a condition of Formula 1 below is met, reception strength from an initial access target BS is less than the threshold and therefore, a terminal uses a separately classified initial ranging preamble code, and a BS allocates a resource to the terminal in the limits of an interference-coordinated frame or channel.

$$\text{Threshold}_{low\ expected\ SINR} > \text{SINR}_{TargetCell} \qquad [1]$$

In Formula 1 above, the 'Threshold$_{low\ expected\ SINR}$' means a reference value of determining that a low SINR is expected, and the 'SINR$_{TargetCell}$' means a reception SINR measured for a selected serving cell.

In a situation where a condition of Formula 2 below is met, reception threshold from an initial access target BS is equal to or greater than the threshold and therefore, a terminal uses a general initial ranging preamble code, and a BS allocates a resource to the terminal in the limits of a general frame or channel.

$$\text{Threshold}_{low\ expected\ SINR} \leq \text{SINR}_{TargetCell} \qquad [2]$$

In Formula 2 above, the 'Threshold$_{low\ expected\ SINR}$' means a reference value of determining that a low SINR is expected, and the 'SINR$_{TargetCell}$' means a reception SINR measured for a selected serving cell.

Figure 7:
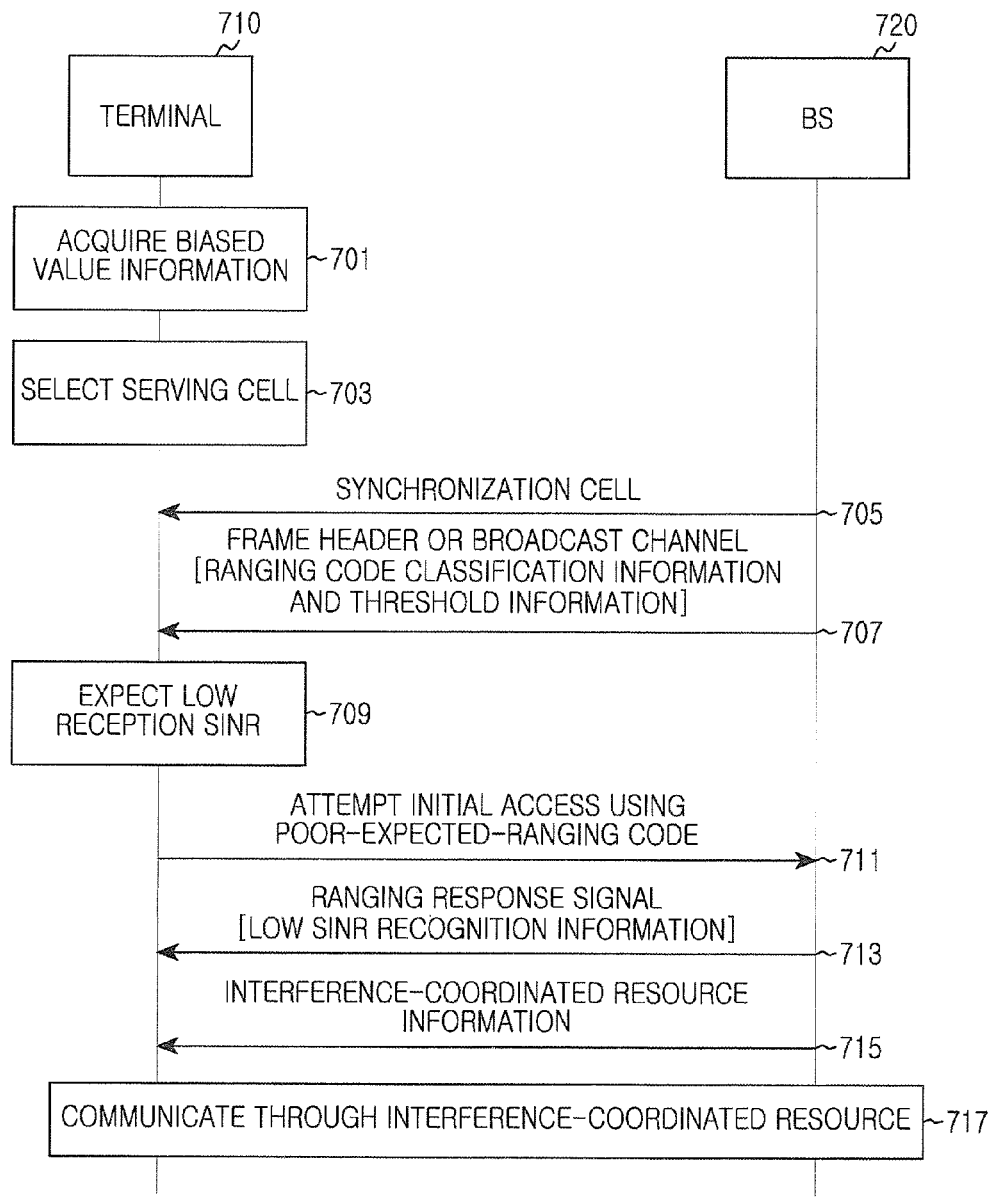
FIG. 7 illustrates signal exchange for initial access in a wireless communication system according to an embodiment of the present disclosure.

FIG. 7 illustrates signal exchange for initial access in a wireless communication system according to an embodiment of the present disclosure.

Referring to FIG. 7, in step 701, a terminal 710 acquires biased value information of BSs applying range expansion. For instance, the biased value information can be received through at least one of a frame header of at least one BS, and a broadcast channel. The biased value information can include a concrete biased value. In another example, the biased value information can be expressed in a form of loading status information of a corresponding cell. In a situation where the biased value information is expressed in the form of the loading status information, the terminal 710 calculates a biased value from a value representing a loading degree. The terminal 710 selects a BS 720 as a serving cell, and the BS 720 applies the range expansion.

In step 703, the terminal 710 selects a serving cell in consideration of the biased value information. In detail, the terminal 710 measures a channel quality of each adjacent BS capable of receiving a signal, signal strength and the like, and compares the channel qualities and retrieves a cell of the most excellent channel quality. The terminal 710 adds a biased value to a channel quality of a cell applying range expansion. For example, the terminal 710 can detect a synchronization channel of each adjacent BS, and measure a channel quality using the synchronization channel. In another example, other reference channels than the synchronization channel can be used.

In step 705, the terminal 710 acquires synchronization with the BS 720 by receiving the synchronization channel of the BS 720. The BS 720 periodically transmits the synchronization channel. The synchronization channel exists in a fixed position on a frame. In step 707, the terminal 710 acquires system information through a frame header of the BS 720 or a broadcast channel. The system information includes ranging code classification information and threshold information. According to an embodiment of the present disclosure, the ranging code classification information includes poor-expected-ranging code allocation information. In a situation where the poor-expected-ranging codes are grouped to notify a different cell exerting interference, the poor-expected-ranging code includes information on poor-expected-ranging code allocation information group classification.

In step 709, the terminal 710 compares the threshold and the channel quality for the BS 720. The present disclosure assumes that the channel quality for the BS 720 is less than the threshold. Accordingly, the terminal 710 is expected to suffer a low reception SINK. Accordingly, in step 711, the terminal 710 attempts initial access using the poor-expected-ranging code. In other words, the terminal 710 transmits the poor-expected-ranging code through a random access channel. In a situation where the poor-expected-ranging codes are grouped to notify a different cell exerting interference, the terminal 710 transmits a poor-expected-ranging code belonging to a group corresponding to a cell exerting the highest interference, i.e., having the most excellent channel quality.

In step 713, the BS 720 detects the poor-expected-ranging code, and sends a ranging response including low channel quality recognition information. The BS 720 can detect the poor-expected-ranging code through correlation operation for a signal received through the random access channel. However, the BS 720 cannot identify the terminal 710 having transmitted the poor-expected-ranging code and therefore, expresses a recipient of the ranging response using at least one of a received code and a detected time point. According to an embodiment of the present disclosure, the ranging response can include the low channel quality recognition information through the poor-expected-ranging code. According to another embodiment of the present disclosure, the ranging response may not include the low channel quality recognition information.

In step 715, the BS 720 transmits interference-coordinated resource information. The interference coordination means a resource management policy in which a different BS having a cell overlaid with the BS 720 transmits no signal during a constant time/frequency duration and, by using low power, minimizes interference in the BS 720. The interference-coordinated resource information can include at least one of a time point at which a subframe/subchannel suffering low interference is transmitted, a period, and an index. The time point at which the subframe/subchannel suffering the low interference is transmitted, the period, and the index can be expressed as a concrete value, or can be expressed as a pre-arranged profile, or can be expressed as an index of a predefined table. According to an embodiment of the present disclosure, the interference-coordinated resource information transmitted to the terminal 710 can include information on all interference-coordinated resources of the BS 720. According to another embodiment of the present disclosure, the interference-coordinated resource information transmitted to the terminal 710 can include only information on an interference-coordinated resource to be allocated to the terminal 710 among all the interference-coordinated resources of the BS 720.

In a situation where the poor-coordinated-ranging codes are grouped to notify a different cell exerting interference, the BS 720 can identify a different cell exerting the highest interference to the terminal 710 according to a group which the poor-expected-ranging code belongs to. Simultaneously, in a situation where the interference coordination is performed with a plurality of other BSs, the interference-coordinated resource can be different by each different BS. In this situation, the BS 720 generates the interference-coordinated resource information in consideration of only interference coordination with a cell instructed by the poor-expected-ranging code.

In FIG. 7, steps 713 and 715 are illustrated as separate steps. However, according to another embodiment of the present disclosure, steps 713 and 715 can be implemented as one step. That is, the BS 720 can include the interference-coordinated resource information in the ranging response.

After that, in step 717, the terminal 710 and the BS 720 perform communication through the interference-coordinated resource. That is, the BS 720 allocates a resource to the terminal 710 within the limits of the interference-coordinated resource. Further, the terminal 710 can reduce power consumption by discontinuing signal reception and decoding operation in durations other than the interference-coordinated resource.

Operations and constructions of a terminal and a BS performing an initial access procedure as above are described below in detail with reference to the drawings.

Figure 8:
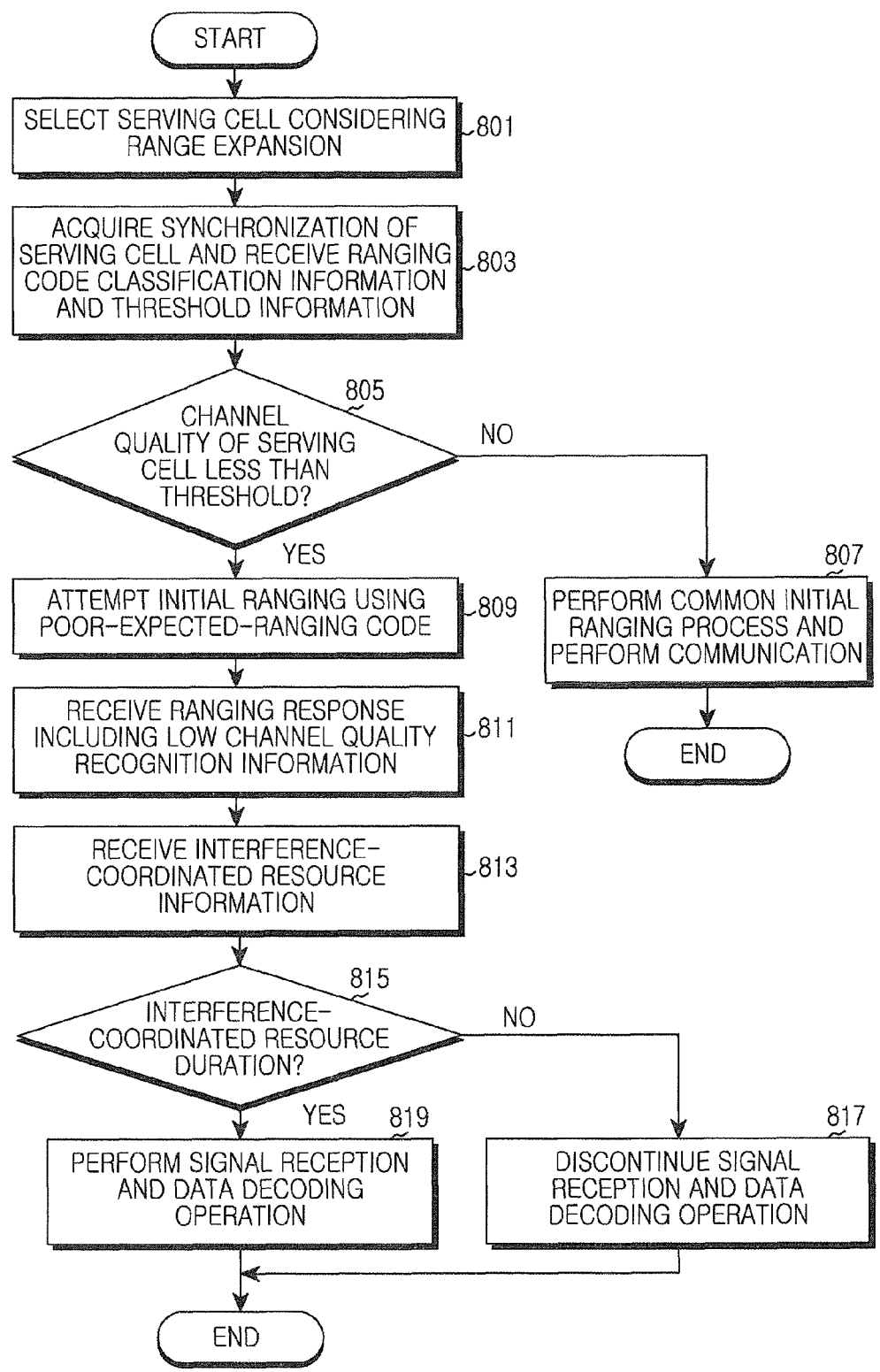
FIG. 8 illustrates an operation procedure of a terminal in a wireless communication system according to an embodiment of the present disclosure.

FIG. 8 illustrates an operation procedure of a terminal in a wireless communication system according to an embodiment of the present disclosure.

Referring to FIG. 8, in step 801, the terminal selects a serving cell in consideration of range expansion. That is, the terminal acquires biased value information of at least one BS applying range expansion, measures reception signal strength for adjacent BSs, then apples a biased value to reception signal strength of the at least one BS, and selects a BS having the maximum reception strength as a serving cell. For instance, the terminal can receive the biased value information through at least one of a frame header of each of at least one or more BSs applying range expansion and a broadcast channel, or can receive the biased value information of the at least one BS applying the range expansion through at least one of a frame header of a specific BS and a broadcast channel. For instance, the terminal can detect a synchronization channel of each adjacent BS, and measure a channel quality using the synchronization channel. In another example, reference channels other than the synchronization channel can be used.

After selecting the serving cell, the terminal proceeds to step 803 and acquires synchronization with the serving cell, and receives ranging code classification information and threshold information. That is, the terminal acquires synchronization by detecting a synchronization channel of the serving cell, and acquires system information including the ranging code classification information and the threshold information through at least one of a frame header of the serving cell and a broadcast channel. According to an embodiment of the present disclosure, the ranging code classification information includes poor-expected-ranging code allocation information. In a situation where the poor-expected-ranging codes are grouped to express a different cell exerting interference, the poor-expected-ranging code includes information on poor-expected-ranging code group classification.

Next, the terminal proceeds to step 805 and determines if a channel quality of the serving cell is less than the threshold. That is, the terminal measures the channel quality of the serving cell, and compares the channel quality with the threshold acquired through the at least one of the frame header and the broadcast channel.

If it is determined in step 805 that the channel quality is greater than or equal to the threshold, the terminal proceeds to step 807 and performs a common initial ranging process, and performs communication with the serving cell. That is, the terminal attempts initial access using a ranging code for initial ranging, not the poor-expected-ranging code and, after proceeding with signaling for initial access, performs communication.

In contrast, if it is determined in step 805 that the channel quality is less than the threshold, the terminal proceeds to step 809 and attempts initial ranging using the poor-expected-ranging code. In other words, the terminal transmits one of ranging preamble codes allocated as poor-expected ranging codes, through a random access channel. In a situation where the poor-expected-ranging codes are grouped to notify a different cell exerting interference, the terminal transmits a poor-expected-ranging code belonging to a group indicating a cell exerting the highest interference, i.e., a cell corresponding to the highest reception signal strength. To determine the cell exerting the highest interference, the terminal can use reception signal strength measured at serving cell selection.

After transmitting the poor-expected-ranging code, the terminal proceeds to step 811 and receives a ranging response including low channel quality recognition information. The ranging response can express a recipient using at least one of a code transmitted by the terminal and a transmission time point. Or, after first confirming broadcasted resource allocation information for the response message, the terminal can receive the ranging response. Or, the terminal can receive the ranging response through a predefined resource. However, according to another embodiment of the present disclosure, the ranging response may not include the low channel quality recognition information.

Next, the terminal proceeds to step 813 and receives interference-coordinated resource information. The interference coordination means a resource management policy in which a different BS having a cell overlaid with the BS of the serving cell transmits no signal during a constant time/frequency duration and, by using low power, minimizes interference in the BS of the serving cell. The interference-coordinated resource information can include at least one of a time point at which an interference-coordinated subframe/subchannel is transmitted, a period, and an index. According to an embodiment of the present disclosure, the interference-coordinated resource information received in step 813 can include information on all interference-coordinated resources of the serving cell. According to another embodiment of the present disclosure, the interference-coordinated resource information received in step 813 can include only information on an interference-coordinated resource to be allocated to the terminal among all the interference-coordinated resources of the serving cell. In a situation where the BS can identify a different cell exerting the highest interference to the terminal by grouping the poor-expected-ranging codes in order to notify a different cell exerting interference, the interference-coordinated resource information received in step 813 can be information considering only interference coordination with a cell instructed by the poor-expected-ranging code transmitted in step 809.

After that, the terminal proceeds to step 815 and determines if an interference-coordinated resource duration arrives. If it is determined in step 815 that the interference-coordinated resource duration does not arrive, the terminal proceeds to step 817 and discontinues signal reception from the serving cell and data decoding operation. In contrast, if it is determined in step 815 that the interference-coordinated resource duration arrives, the terminal proceeds to step 819 and initiates signal reception from the serving cell and data decoding operation. That is, the terminal performs communication in the limits of the interference-coordinated resource.

Figure 9:
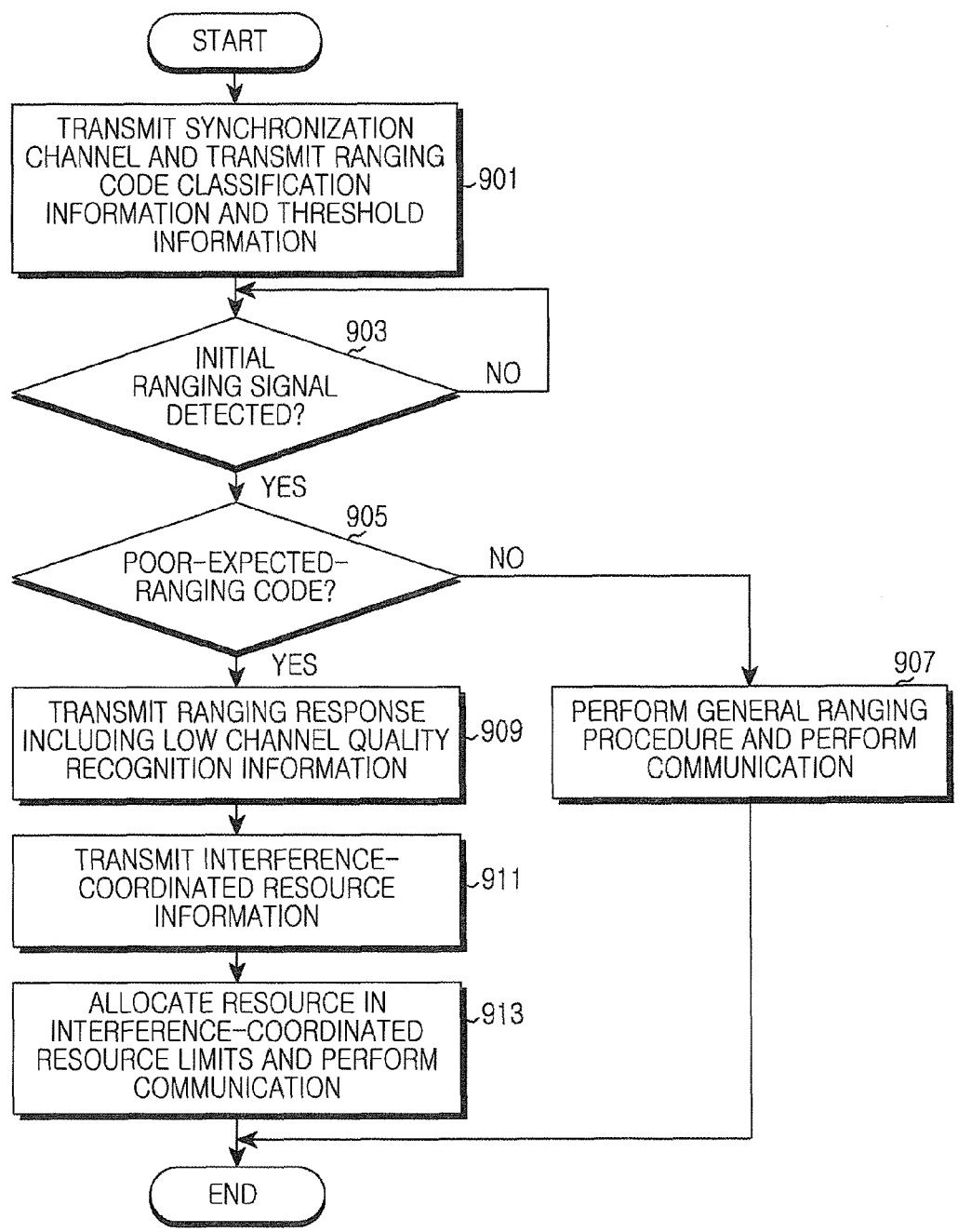
FIG. 9 illustrates an operation procedure of a Base Station (BS) in a wireless communication system according to an embodiment of the present disclosure.

FIG. 9 is a flowchart illustrating an operation procedure of a BS in a wireless communication system according to an embodiment of the present disclosure.

Referring to FIG. 9, in step 901, the BS transmits a synchronization channel, and transmits ranging code classification information and threshold information. The BS periodically transmits the synchronization channel. The synchronization channel exists in a fixed position on a frame. Also, the BS periodically transmits system information including the ranging code classification information and the threshold information through at least one of a frame header and a broadcast channel. According to an embodiment of the present disclosure, the ranging code classification information includes poor-expected-ranging code allocation information. In a situation where the poor-expected-ranging codes are grouped to notify a different cell exerting interference, the poor-expected-ranging code includes information on poor-expected-ranging code allocation information group classification. The system information can further include information indicating that the BS applies range expansion, and biased value information.

After that, the BS proceeds to step 903 and determines if an initial ranging signal is detected. The BS can detect the initial ranging signal through correlation operation for a signal received through a random access channel. Also, the BS can identify a code of the initial ranging signal that is detected using the result of the correlation operation.

If it is determined in step 903 that the initial ranging signal is detected, the BS proceeds to step 905 and determines if the initial ranging signal is a poor-expected-ranging code. In other words, the BS determines if a terminal has transmitted a poor-expected-ranging code according to poor-expected-ranging code allocation information transmitted in step 901. In a situation where the poor-expected-ranging codes are grouped to notify a different cell exerting interference, the BS can identify a different cell exerting the highest interference to the terminal through the poor-expected-ranging code.

If it is determined in step 905 that the initial ranging signal is not the poor-expected-ranging code, the BS proceeds to step 907 and performs a general ranging procedure, and performs communication. That is, the BS performs an initial ranging procedure using a ranging code for initial ranging, not the poor-expected-ranging code and, after proceeding with signaling for initial access, performs the communication.

In contrast, if it is determined in step 905 that the initial ranging signal is the poor-expected-ranging code, the BS proceeds to step 909 and recognizes that the terminal having transmitted the poor-expected-ranging code has a channel quality of the threshold or less, and sends a ranging response including low channel quality recognition information. The BS cannot identify the terminal having transmitted the poor-expected-ranging code and therefore, can express a recipient of the ranging response using at least one of a received code and a detected time point. Or, after first broadcasting resource allocation information for the ranging response, the BS can send the ranging response message. Or, the BS can send the ranging response through a predefined resource. However, according to another embodiment of the present disclosure, the ranging response may not include the low channel quality recognition information.

Next, the BS proceeds to step 911 and transmits interference-coordinated resource information. The interference coordination means a resource management policy in which a different BS having a cell overlaid with the BS of the serving cell transmits no signal during a constant time/frequency duration and, by using low power, minimizes interference in the BS of the serving cell. The interference-coordinated resource information can include at least one of a time point at which an interference-coordinated subframe/subchannel is transmitted, a period, and an index. According to an embodiment of the present disclosure, the interference-coordinated resource information transmitted in step 911 can include information on all interference-coordinated resources of the BS. According to another embodiment of the present disclosure, the interference-coordinated resource information transmitted in step 911 can include only information on an interference-coordinated resource to be allocated to the terminal among all the interference-coordinated resources of the BS. In a situation where the BS can identify a different cell exerting the highest interference to the terminal by grouping the poor-expected-ranging codes in order to notify a different cell exerting interference, the interference-coordinated resource information transmitted in step 911 can be information considering only interference coordination with a cell instructed by the poor-expected-ranging code received in step 905.

After that, the BS proceeds to step 913 and allocates a resource to the terminal in the limits of the interference-coordinated resource, and performs communication. That is, in durations other than interference-coordinated resource duration, the BS excludes the terminal from a scheduling target.

Figure 10:
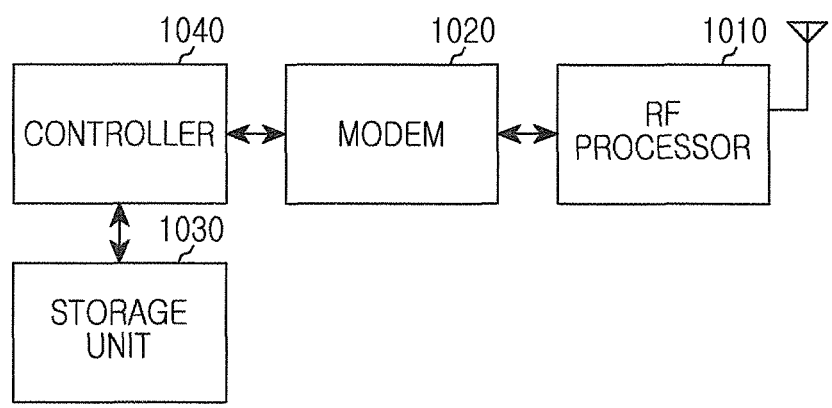
FIG. 10 illustrates a construction of a terminal in a wireless communication system according to an embodiment of the present disclosure.

FIG. 10 illustrates a construction of a terminal in a wireless communication system according to an embodiment of the present disclosure.

As illustrated in FIG. 10, the terminal includes a Radio Frequency (RF) processor 1010, a modulator/demodulator (modem) 1020, a storage unit 1030, and a controller 1040.

The RF processor 1010 performs functions for transmitting and receiving a signal through a wireless channel such as signal band conversion, amplification and the like. That is, the RF processor 1010 up converts a baseband signal provided from the modem 1020 into an RF band signal and then transmits the RF band signal through an antenna, and down converts an RF band signal received through the antenna into a baseband signal. For example, the RF processor 1010 can include an amplifier, a mixer, an oscillator, a Digital to Analog Converter (DAC), an Analog to Digital Converter (ADC), and the like.

The modem 1020 performs a function of conversion between a baseband signal and a bit stream according to the physical layer standard of the system. For example, according to an Orthogonal Frequency Division Multiplexing (OFDM) scheme, at data transmission, the modem 1020 creates complex symbols by encoding and modulating a transmission bit stream, maps the complex symbols to subcarriers, and then constructs OFDM symbols through Inverse Fast Fourier Transform (IFFT) operation and Cyclic Prefix (CP) insertion. Also, at data reception, the modem 1020 divides a baseband signal provided from the RF processor 1010 in the unit of OFDM symbol, restores signals mapped to subcarriers through Fast Fourier Transform (FFT) operation, and restores a reception bit stream through demodulation and decoding.

The storage unit 1030 stores data of a basic program for an operation of the terminal, an application program, system setup information, user setup information and the like. And, the storage unit 1030 provides the stored data according to a request of the controller 1040.

The controller 1040 controls a general function of the terminal. For example, the controller 1040 creates a transmission packet and provides the created packet to the modem 1020, and interprets a reception packet provided from the modem 1020. According to an embodiment of the present disclosure, the controller 1040 controls functions for proceeding with an initial access procedure. For example, the controller 1040 controls the terminal to operate as illustrated in FIG. 8.

An operation of the controller 1040 for proceeding with the initial access procedure is given as follows. First, the controller 1040 acquires biased value information of at least one BS applying range expansion, measures reception signal strength for adjacent BSs through the modem 1020, applies a biased value to the reception signal strength of the at least one BS, and selects a BS having the maximum reception signal strength as a serving cell. Further, the controller 1040 acquires synchronization through a synchronization channel of the serving cell and, by receiving system information, acquires ranging code classification information and threshold information. Here, the ranging code classification information includes poor-expected-ranging code allocation information. In a situation where the poor-expected-ranging codes are grouped to express a different cell exerting interference, the poor-expected-ranging code includes information on poor-expected-ranging code group classification.

Further, the controller 1040 measures a channel quality of the serving cell, and compares the channel quality and the threshold. If the channel quality is less than the threshold, the controller 1040 controls to transmit the poor-expected-ranging code through a random access channel. In a situation where the poor-expected-ranging codes are grouped to notify a different cell exerting interference, the controller 1040 transmits poor-expected-ranging codes belonging to a group indicating a cell exerting the highest interference, i.e., a cell corresponding to the highest reception signal strength. After that, the controller 1040 receives a ranging response and interference-coordinated resource information. The interference-coordinated resource information can include at least one of a time point at which interference-coordinated subframe/subchannel is transmitted, a period, and an index. And, the controller 1040 controls to perform communication in the limits of an interference-coordinated resource. That is, while it is not a duration of the interference-coordinated resource, the controller 1040 discontinues operations of the modem 1020 and the RF processor 1010.

Figure 11:
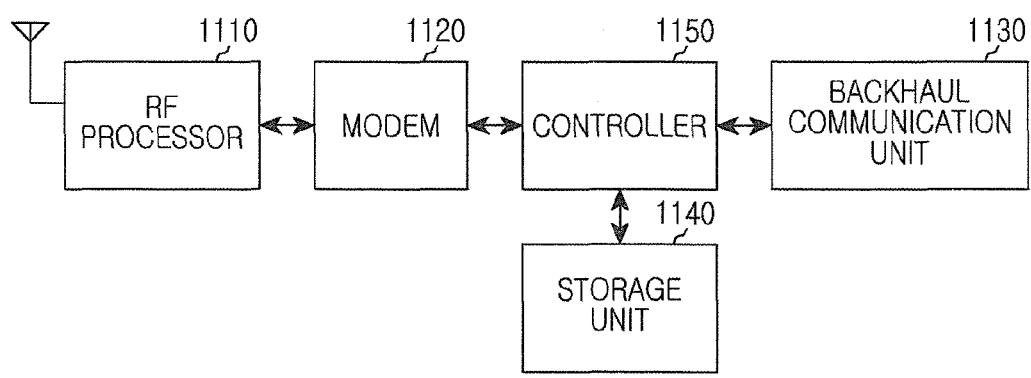
FIG. 11 illustrates a construction of a BS in a wireless communication system according to an embodiment of the present disclosure.

FIG. 11 illustrates a construction of a BS in a wireless communication system according to an embodiment of the present disclosure.

As illustrated in FIG. 11, the BS includes an RF processor 1110, a modem 1120, a backhaul communication unit 1130, a storage unit 1140, and a controller 1150.

The RF processor 1110 performs functions for transmitting and receiving a signal through a wireless channel such as signal band conversion, amplification and the like. That is, the RF processor 1110 up converts a baseband signal provided from the modem 1120 into an RF band signal and then transmits the RF band signal through an antenna, and down converts an RF band signal received through the antenna into a baseband signal. For example, the RF processor 1110 can include an amplifier, a mixer, an oscillator, a DAC, an ADC, and the like.

The modem 1120 performs a function of conversion between a baseband signal and a bit stream according to the physical layer standard of the system. For example, according to an OFDM scheme, at data transmission, the modem 1120 creates complex symbols by encoding and modulating a transmission bit stream, maps the complex symbols to subcarriers, and then constructs OFDM symbols through IFFT operation and CP insertion. Also, at data reception, the modem 1120 divides a baseband signal provided from the RF processor 1110 in the unit of OFDM symbol, restores signals mapped to subcarriers through FFT operation, and restores a reception bit stream through demodulation and decoding.

The backhaul communication unit 1130 provides an interface for the BS to perform communication with a different node, for example, a macro BS. That is, the backhaul communication unit 1130 converts a bit stream transmitted from the BS to the different node into a physical signal, and converts a physical signal received from the different node into a bit stream. The storage unit 1140 stores data of a basic program for an operation of the BS, an application program, system setup information, and the like. And, the storage unit 1140 provides the stored data according to a request of the controller 1150.

The controller 1150 controls a general function of the BS. For example, the controller 1150 creates a transmission packet and provides the created packet to the modem 1120 or the backhaul communication unit 1130, and interprets a reception packet provided from the modem 1120 or the backhaul communication unit 1130. Also, the controller 1150 controls to periodically transmit a synchronization channel and system information including ranging code classification information and threshold information. According to an embodiment of the present disclosure, the ranging code classification information includes poor-expected-ranging code allocation information. In a situation where the poor-expected-ranging codes are grouped to notify a different cell exerting interference, the poor-expected-ranging, code includes information on poor-expected-ranging code allocation information group classification. The system information can further include information indicating that the BS applies range expansion, and biased value information. Also, the controller 1150 controls functions for proceeding with an initial access procedure of a terminal. For example, the controller 1150 controls the BS to operate as illustrated in FIG. 9.

An operation of the controller 1150 for the initial access procedure is given as follows. If an initial ranging signal transmitted by a terminal is detected, the controller 1150 determines if the initial ranging signal is a poor-expected-ranging code. If the initial ranging signal is the poor-expected-ranging code, the controller 1150 transmits a ranging, response and interference-coordinated resource information through the modem 1120 and the RF processor 1110. According to an embodiment of the present disclosure, the interference-coordinated resource information can include information on all interference-coordinated resources of the BS. According to another embodiment of the present disclosure, the interference-coordinated resource information can include only information on an interference-coordinated resource to be allocated to the terminal among all the interference-coordinated resources of the BS. In a situation where the BS can identify a different cell exerting the highest interference to the terminal by grouping the poor-expected-ranging codes in order to notify a different cell exerting interference, the interference-coordinated resource information can be information considering only interference coordination with a cell instructed by the received poor-expected-ranging code. After that, the controller 1150 controls to allocate a resource to the terminal in the limits of the interference-coordinated resource, and perform communication.

As described above, exemplary embodiments of the present disclosure can prevent power consumption of a terminal and increase the whole system transmission efficiency, by selectively using only a resource of a good channel state after initial ranging to a cell having a channel of low quality by a range expansion technology in a wireless communication system.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for an operation of a terminal in a wireless communication system, the method comprising:
   selecting a serving cell in consideration of a biased value for a base station (BS) applying range expansion;
   receiving ranging code classification information and channel quality threshold information associated with the serving cell;
   if a channel quality with the serving cell is less than a channel quality threshold of the channel quality threshold information, selecting one of a plurality of poor-expected-ranging codes indicated by the ranging code classification information; and
   performing initial ranging using the selected poor-expected-ranging code.

2. The method of claim 1, wherein the ranging code classification information comprises allocation information on the poor-expected-ranging codes.

3. The method of claim 2, wherein the allocation information on the poor-expected-ranging codes comprises group classification information indicating a result of classifying the poor-expected-ranging codes into a plurality of groups, each of the plurality of groups indicating each of a plurality of adjacent BSs of the serving cell.

4. The method of claim 3, wherein selecting one of the poor-expected-ranging codes comprises selecting a poor-expected-ranging code belonging to a group indicating an adjacent BS corresponding to reception signal strength higher than that of the serving cell.

5. The method of claim 1, further comprising receiving information regarding an interference-coordinated resource from the serving cell.

6. The method of claim 5, wherein the information regarding the interference-coordinated resource comprises at least one of: a time point at which an interference-coordinated subframe or subchannel is transmitted, a period, and an index.

7. The method of claim 5, wherein the information regarding the interference-coordinated resource comprises information regarding an interference-coordinated resource to be allocated to the terminal.

8. The method of claim 5, wherein the information regarding the interference-coordinated resource is information considering interference coordination with a different BS indicated by the poor-expected-ranging code.

9. The method of claim 5, further comprising, if the information is not an interference-coordinated resource duration, discontinuing signal reception and decoding operation.

10. The method of claim 1, wherein the serving cell has coverage overlaid with a macro cell.

11. A method for an operation of a base station (BS) in a wireless communication system, the method comprising:
transmitting ranging code classification information and channel quality threshold information;
receiving one of a plurality of poor-expected-ranging codes indicated by the ranging code classification information; and
recognizing that a terminal having transmitted the poor-expected-ranging code has a channel quality less than or equal to a channel quality threshold of the channel quality threshold information.

12. The method of claim 11, wherein the ranging code classification information comprises allocation information on the poor-expected-ranging codes.

13. The method of claim 12, wherein the allocation information on the poor-expected-ranging codes comprises group classification information indicating a result of classifying the poor-expected-ranging codes into a plurality of groups, each of the plurality of groups indicating each of a plurality of adjacent BSs of the serving cell.

14. The method of claim 11, further comprising transmitting information regarding an interference-coordinated resource to the terminal.

15. The method of claim 14, wherein the information regarding the interference-coordinated resource comprises at least one of: a time point at which an interference-coordinated subframe or subchannel is transmitted, a period, and an index.

16. The method of claim 14, wherein the information regarding the interference-coordinated resource comprises information regarding an interference-coordinated resource to be allocated to the terminal.

17. The method of claim 14, wherein the information regarding the interference-coordinated resource is information considering interference coordination with a different BS indicated by the poor-expected-ranging code.

18. The method of claim 14, further comprising performing communication with the terminal within the limits of the interference-coordinated resource.

19. A terminal apparatus in a wireless communication system, the apparatus comprising:
a controller configured to select a serving cell in consideration of a biased value for a base station (BS) applying range expansion; and
a modulator/demodulator (modem) configured to receive ranging code classification information and channel quality threshold information associated with the serving cell,
wherein, if a channel quality with the serving cell is less than a channel quality threshold of the channel quality threshold information, the controller is configured to control to select one of a plurality of poor-expected-ranging codes indicated by the ranging code classification information, and perform initial ranging using the selected poor-expected-ranging code.

20. The apparatus of claim 19, wherein the ranging code classification information comprises allocation information on the poor-expected-ranging codes.

21. The apparatus of claim 20, wherein the allocation information on the poor-expected-ranging codes comprises group classification information indicating a result of classifying the poor-expected-ranging codes into a plurality of groups, each of the plurality of groups indicating each of a plurality of adjacent BSs of the serving cell.

22. The apparatus of claim 21, wherein the controller is configured to select a poor-expected-ranging code belonging to a group indicating an adjacent BS corresponding to reception signal strength higher than that of the serving cell.

23. The apparatus of claim 19, wherein the modem is configured to receive information regarding an interference-coordinated resource from the serving cell.

24. The apparatus of claim 23, wherein the information regarding the interference-coordinated resource comprises at least one of: a time point at which an interference-coordinated subframe or subchannel is transmitted, a period, and an index.

25. The apparatus of claim 23, wherein the information regarding the interference-coordinated resource comprises information regarding an interference-coordinated resource to be allocated to the terminal.

26. The apparatus of claim 23, wherein the information regarding the interference-coordinated resource is information considering interference coordination with a different BS indicated by the poor-expected-ranging code.

27. The apparatus of claim 23, wherein, if the information is not an interference-coordinated resource duration, the controller is configured to discontinue signal reception and decoding operation.

28. The apparatus of claim 19, wherein the serving cell has coverage overlaid with a macro cell.

29. A base station (BS) apparatus in a wireless communication system, the apparatus comprising:
a modulator/demodulator (modem) configured to transmit ranging code classification information and channel quality threshold information; and
a controller configured to, if one of a plurality of poor-expected-ranging codes indicated by the ranging code classification information is received, recognize that a terminal having transmitted the poor-expected-ranging code has a channel quality less than or equal to a channel quality threshold of the channel quality threshold information.

30. The apparatus of claim 29, wherein the ranging code classification information comprises allocation information on the poor-expected-ranging codes.

31. The apparatus of claim 30, wherein the allocation information on the poor-expected-ranging codes comprises group classification information indicating a result of classifying the poor-expected-ranging codes into a plurality of groups,
 each of the plurality of groups indicating each of a plurality of adjacent BSs of the serving cell.

32. The apparatus of claim 29, wherein the modem transmits information regarding an interference-coordinated resource to the terminal.

33. The apparatus of claim 32, wherein the information regarding the interference-coordinated resource comprises at least one: of a time point at which an interference-coordinated subframe or subchannel is transmitted, a period, and an index.

34. The apparatus of claim 32, wherein the information regarding the interference-coordinated resource comprises information regarding an interference-coordinated resource to be allocated to the terminal.

35. The apparatus of claim 32, wherein the information regarding the interference-coordinated resource is information considering interference coordination with a different BS indicated by the poor-expected-ranging code.

36. The apparatus of claim 32, wherein the controller is configured to perform communication with the terminal within the limits of the interference-coordinated resource.

* * * * *